United States Patent [19]

Maeda

[11] Patent Number: 4,858,046
[45] Date of Patent: Aug. 15, 1989

[54] HEAD FEED DEVICE

[75] Inventor: Masaya Maeda, Kanagawa, Japan

[73] Assignee: Canon Kabushiki Kaisha, Tokyo, Japan

[21] Appl. No.: 183,418

[22] Filed: Apr. 18, 1988

Related U.S. Application Data

[63] Continuation of Ser. No. 895,346, Aug. 11, 1986, abandoned.

[30] Foreign Application Priority Data

Aug. 12, 1985 [JP] Japan .................................. 60-175777

[51] Int. Cl.⁴ ............................................. G11B 5/55
[52] U.S. Cl. .................................................... 360/106
[58] Field of Search ................... 360/106; 74/424.8 R, 74/424.8 A, 89.15, 84, 426, 459

[56] References Cited

U.S. PATENT DOCUMENTS

| | | | |
|---|---|---|---|
| 4,022,076 | 5/1977 | Metz | 74/424.8 H |
| 4,139,877 | 2/1979 | Townsend | 360/106 |
| 4,313,141 | 1/1982 | Yanagida | 360/106 X |

Primary Examiner—A. J. Heinz
Attorney, Agent, or Firm—Toren, McGeady & Associates

[57] ABSTRACT

A head feed device for shifting a head carriage through the rotation of a screw shaft enhances head feeding precision by arranging the shaft part of the screw shaft to serve as a guide shaft for guiding the head carriage.

26 Claims, 2 Drawing Sheets

HEAD FEED DEVICE

This is a continuation of application Ser. No. 895,346, filed Aug. 11, 1986 now abandoned.

BACKGROUND OF THE INVENTION

1. Field of the Invention

This invention relates to a head feed device to be employed in a magnetic disc recording apparatus and, more particularly, in an electronic camera of the kind arranged to record still pictures on a compact magnetic disc.

2. Description of the Related Art

FIGS. 1(A) and 1(B) of the accompanying drawings show, by way of example, the magnetic head feed device of the conventional apparatus of the above-stated kind. Referring to FIGS. 1(A) and 1(B), a motor 3 is secured to a chassis 1. A spindle 4 is mounted on the rotating shaft of the motor. A core part of a magnetic disc 2 is arranged to be secured to the spindle 4. A carriage 6 is slidably mounted, via oil impregnated sintered bearings 8 and 8', on two guide shafts 7 and 9 which are secured to the chassis 1.

On the carriage 6 is mounted a magnetic head 5 which is arranged to be used solely for recording or solely for reproduction or both for recording and reproduction. A feeding helical screw shaft 11 is arranged in parallel with the guide shaft 9. The two ends of the screw shaft 11 are rotatably carried through bearings 10 and 10'. To one end of the screw shaft 11 is secured a gear 12. The gear 12 engages a gear 13 which is secured to the output shaft of a stepping motor 14. The carriage 6 is provided with a projection 6a which protrudes from the base part of the carriage 6. The projection 6a engages the above-stated screw shaft 11. A datum face 6b is formed on the reverse side of the fore end part of the carriage 6. The datum face 6b is in contact with the upper side of the guide shaft 7. The position of the magnetic head 5, in the direction perpendicular to the face of the magnetic head 5 confronting the surface of the magnetic disc 2, is defined jointly by the datum face 6b and the guide shaft 7.

The electronic still picture camera is generally standardized to form 50 circular recording tracks on a compact magnetic disc 2 at a pitch of 100 $\mu$m. According to the standards generally accepted, the positional precision of the recording tracks must be set at $\pm 14$ $\mu$m. Positional precision required for the magnetic disc 2 becomes severer in the light of expansion and contraction of the disc 2 due to temperature and humidity. The most important factors upon which the positional precision of the magnetic head 5 hinges, include the thread cutting precision of the feed screw shaft 11 and the rotating angular precision of the stepping motor 14.

However, even if the feed screw precision is adequately obtainable, the positional precision of tracks is hardly obtainable if the degree of parallelism between the screw shaft 11 and the guide shaft 9 is insufficient. The reason for this is as follows:

Referring now to FIG. 2, let us assume that the magnetic head is shifted to an extent (5 mm) corresponding to 50 recording tracks by the rotation of the shaft 11. Then, in case that the screw shaft 11 is perfectly in parallel with the guide shaft 9 as indicated by a full line in FIG. 2, an error in the position of tracks arises as an error in the pitch of the feed screw. Assuming that the sectional shape of the thread groove of the screw shaft 11 is in a pedestal shape of an inclination of 30 degrees, if the contact point of the projection 6a with the screw shaft 11 is deviating d $\mu$m from the axis of the screw shaft 11 in the radial direction, the deviation of the head shifting direction in the radial direction becomes d tan 15 degrees. The degree of deviation d is dependent upon the degree of parallelism between the screw shaft 11 and the guide shaft 9. An error in the parallelism results in the track position error as indicated by a broken line in FIG. 2. Assuming that the thread cutting precision is $\pm 5$ $\mu$m or thereabout, if the track position error as a whole is to be kept within $\pm 10$ $\mu$m, a condition for that degree of precision becomes $10-5 > d$ tan 15 degrees. Then, the extent of deviation due to the error in the parallelism between the screw shaft 11 and the guide shaft 9 must be kept to a value not exceeding 18 $\mu$m.

However, the structural arrangement of the conventional head feed device does not assure the above-stated degree of parallelism because the bearing 10 of the screw shaft 11 and the guide shaft 9 are separately mounted on the chassis as shown in FIG. 1(A).

SUMMARY OF THE INVENTION

It is an object of this invention to provide a head feed device which is capable of solving the above-stated problem of the prior art. To attain this object, a head feed device embodying this invention is arranged such that one and the same part serves both as a guide shaft and as the shaft part of a screw shaft and that a head carriage is mounted on this guide shaft via an oil impregnated sintered bearing.

With the invented device arranged as described above, unlike the conventional device, the use of two shafts is replaced with an arrangement to have the shaft part of the screw shaft serve as the guide shaft. This obviates the necessity of meeting the requirement for parallelism so that the positional precision of recording tracks can be greatly improved.

Other objects and features of this invention will become apparent from the following detailed description taken in conjunction with the accompanying drawings.

DETAILED DESCRIPTION OF THE PREFERRED EMBODIMENT

The following description of a preferred embodiment of this invention shows the details of the invention with reference to the accompanying drawings.

Figure 1A:
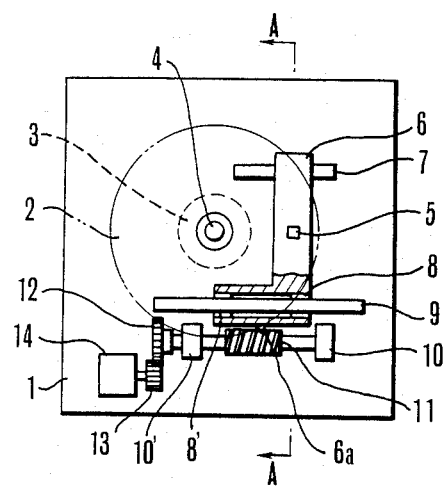
FIG. 1(A) is a partly sectional plan view showing the arrangement of the conventional head feed device.
Figure 1B:
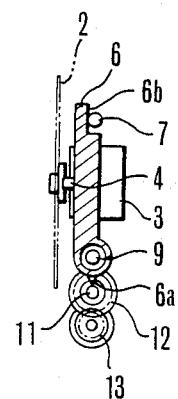
FIG. 1(B) is a sectional view taken along a line A—A of FIG. 1(A).
Figure 2:
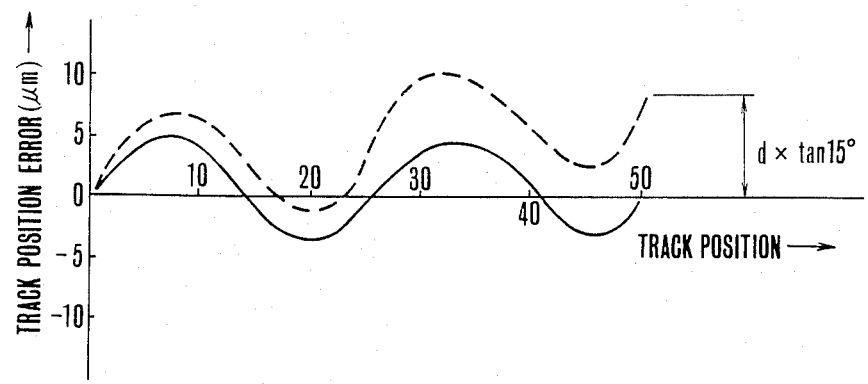
FIG. 2 is a diagrammatic view showing a track position error in relation to a track position.
Figure 3A:
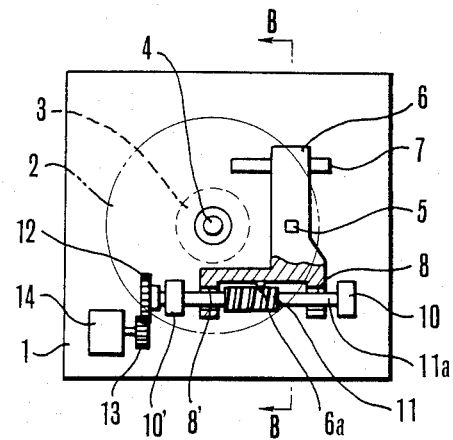
FIG. 3(A) is a partly sectional plan view showing an embodiment of this invention.
Figure 3B:
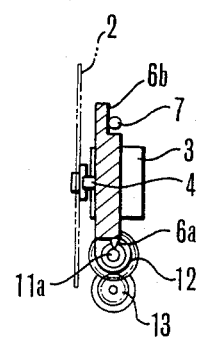
FIG. 3(B) is a sectional view taken along a line B—B of FIG. 3(A).

The embodiment is arranged as shown in FIGS. 3(A) and 3(B). The parts which are the same as those shown in FIGS. 1(A) and 1(B) are indicated by the same reference numerals and details of them are omitted from the following description: In this embodiment, shaft parts 11a, formed at both ends of a screw shaft 11, are arranged to serve as guide shafts. These shaft parts 11a are attached to the chassis 1 via the bearings 10 and 10', which are arranged to serve as coupling means.

The head carriage 6 is provided with a base part which is arranged to straddle the screw shaft 11 and is slidably fitted on the shaft parts 11a through oil impregnated sintered bearings 8 and 8'.

With the embodiment arranged in this manner, the shaft parts 11a are at the standard finishing accuracy obtained through machining work on the screw shaft 11 and errors, in terms of straightness, precision of the coaxial state, etc., can be held within several μm.

Further, the shaft movement on the oil impregnated sintered bearing is a rotational sliding motion instead of a mere sliding motion. This is advantageous in terms of lubrication as it prompts the exudation of oil from within the oil impregnated sintered bearing 8.

In accordance with the invented arrangement, as apparent from the foregoing description, the shaft part of the head carriage feeding screw shaft is arranged to serve also as a guide shaft; and the base part of the carriage is rotatably and slidably mounted on the shaft part via the oil impregnated sintered bearing. Therefore, unlike in the case of the conventional device, the invented device obviates the necessity of taking into consideration the parallelism between a guide shaft and a screw shaft and yet greatly enhances the precision of the recording track position.

What is claimed is:

1. A head feed device comprising:
   (a) a head arranged to perform a recording and/or reproducing operation on a recording medium;
   (b) a carriage member arranged to carry said head and to be displaceable for causing said head to face different parts of said recording medium;
   (c) guide means arranged to linearly guide the displacement of said carriage member along a surface of said recording medium, said guide means having two parallel guide shafts, one of said guide shafts having two parts on its axis provided so as to be engageable with two engaging portions of said carriage member so as to movably guide said carriage member; said two guide parts being shafts having smooth and uninterrupted cylindrical surfaces which provides a respective continuous surface for contact with each respective engaging portion;
   (d) a transmission member arranged and fixed to a part of said one guide shaft between said two guide parts so as to displace said carriage member, said transmission member having a lead screw member provided so as to engage a portion of said carriage member between said two engaging portions; and
   (e) a drive source arranged to rotate said transmission member.

2. A device according to claim 1, wherein said head is a magnetic head.

3. A device according to claim 2, wherein said recording medium is a magnetic recording medium.

4. A device according to claim 1, wherein said recording medium is disc-shaped.

5. A device according to claim 4, further comprising a motor which is arranged to rotate said disc-shaped recording medium.

6. A device according to claim 4, wherein said guide shaft is arranged to guide said carriage member in a direction in parallel with a radial direction of said disc-shaped recording medium.

7. A device according to claim 1, wherein said transmission member includes a helical screw having a helical groove.

8. A device according to claim 7, wherein said carriage member is provided with a projection which is formed at a part of the carriage member and is arranged to be guided by the helical groove of said helical screw.

9. A head feed device comprising:
   (a) a head arranged to perform a recording and/or reproducing operation on a recording medium;
   (b) a carriage member arranged to carry said head and to be displaceable for causing said head to face different parts of said recording medium;
   (c) guide means arranged to linearly guide the displacement of said carriage member along a surface of said recording medium, said guide means having two parallel guide shafts, one of said guide shafts having two parts on its axis provided so as to be engageable with two engaging portions of said carriage member so as to movably guide said carriage member; said two guide parts being shafts having smooth and uninterrupted cylindrical surfaces which provides a respective continuous surface for contact with each respective engaging portion;
   (d) a rotating member rotating on said guide shaft using the guide shaft as an axis of rotation thereof, said rotating member being arranged to a part of said one guide shaft between said two guide parts to transmit a driving force to said carriage member for said displacement of the carriage member, said rotating member being arranged so as to transform rotary movement thereof into movement for moving said carriage in an axial direction; and
   (e) a drive source which is coupled with said rotating member and is arranged to cause said rotating member to rotate.

10. A device according to claim 9, wherein said head is a magnetic head.

11. A device according to claim 10, wherein said recording medium is a magnetic recording medium.

12. A device according to claim 9, wherein said recording medium is disc-shaped.

13. A device according to claim 12, further comprising a motor which is arranged to rotate said disc-shaped recording medium.

14. A device according to claim 12, wherein said guide shaft is arranged to guide said carriage member in a direction in parallel with a radial direction of said disc-shaped recording medium.

15. A device according to claim 9, wherein said rotating member includes a helical screw which has a helical groove.

16. A device according to claim 15, wherein said carriage member is provided with a projection which is formed at a part of the carriage member and is arranged to be guided by the helical groove of said helical screw.

17. A head feed device comprising:
   (a) a head arranged to perform a recording and/or reproducing operation on a recording medium;
   (b) a carriage member arranged to carry said head;
   (c) a drive source arranged to display and shift said carriage member along a surface of said recording medium;
   (d) a transmission shaft having a transmitting member provided at a part thereof for transmitting the driving force of said drive source to said carriage member, said transmission shaft having guide shaft portions on both sides of said transmission member which engage two engaging portions on said carriage member to movably guide said carriage member in an axial direction and do not transmit the driving force;

said guide shaft portions being shafts having smooth and uninterrupted cylindrical surfaces which provides a respective continuous surface for contact with each respective engaging portion;

(e) a guide shaft arranged parallel to said transmission shaft so as to engage with said carriage member and movably guide said carriage member in its axial direction; and (f) coupling means for slidably coupling said carriage member at said guide shaft portions on both sides of said transmitting member.

18. A device according to claim 17, wherein said head is a magnetic head.

19. A device according to claim 18, wherein said recording medium is a magnetic recording medium.

20. A device according to claim 18, wherein said recording medium is disc-shaped.

21. A device according to claim 20, further comprising a motor which is arranged to rotate said disc-shaped recording medium.

22. A device according to claim 20, wherein said transmission shaft is arranged to guide said carriage member in parallel with a radial direction of said disc-shaped recording medium.

23. A device according to claim 17, wherein said transmission shaft includes a helical screw which has a helical groove.

24. A device according to claim 23, wherein said carriage member is provided with a projection which is formed at a part of the carriage member and is arranged to be guided by the helical groove of said helical screw.

25. A device according to claim 17, wherein said coupling means includes a bearing which is arranged at said carriage member to have said transmission shaft inserted therethrough.

26. A device according to claim 25, wherein said bearing is an oil impregnated sintered bearing.

* * * * *